(12) United States Patent  
Zhu et al.

(10) Patent No.: US 9,402,262 B2
(45) Date of Patent: Jul. 26, 2016

(54) WIRELESS RESOURCE ALLOCATION OF DEVICE-TO-DEVICE COMMUNICATION (71) Applicant: FUJITSU LIMITED, Kawasaki-shi, Kanagawa (JP)

(72) Inventors: Chenxi Zhu, Fairfax, VA (US); Akira Ito, San Jose, CA (US); Huy-Dung Han, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 219 days.

(21) Appl. No.: 14/095,805

(22) Filed: Dec. 3, 2013

(65) Prior Publication Data

US 2014/0274183 A1 Sep. 18, 2014

Related U.S. Application Data (60) Provisional application No. 61/785,458, filed on Mar. 14, 2013.

(51) Int. Cl.
*H04B 7/00* (2006.01)
*H04W 72/08* (2009.01)

(52) U.S. Cl.
CPC .................................. *H04W 72/082* (2013.01)

(58) Field of Classification Search
CPC .... H04W 72/082; H04W 52/04; H04W 8/005
USPC ..................... 455/513, 523, 452.2, 452.1, 501
See application file for complete search history.

(56) References Cited

U.S. PATENT DOCUMENTS

| | | | | |
|---|---|---|---|---|
| 7,092,732 B2* | 8/2006 | Tamaki | ................. | H04W 74/02 370/338 |
| 9,002,281 B2* | 4/2015 | Fwu | ..................... | H04W 72/02 370/328 |
| 2006/0098594 A1* | 5/2006 | Ganesh | .................. | G01D 21/00 370/328 |
| 2010/0093364 A1* | 4/2010 | Ribeiro | ............... | H04W 72/082 455/452.2 |
| 2010/0261469 A1* | 10/2010 | Ribeiro | ................. | H04W 99/00 455/423 |
| 2011/0159897 A1* | 6/2011 | Choi | ................... | H04W 52/243 455/501 |
| 2011/0312331 A1* | 12/2011 | Hakola | ............... | H04W 72/085 455/452.2 |
| 2012/0028672 A1 | 2/2012 | Chen et al. | | |
| 2012/0184306 A1* | 7/2012 | Zou | ..................... | H04W 76/023 455/458 |
| 2012/0250636 A1 | 10/2012 | Wang et al. | | |
| 2013/0010682 A1* | 1/2013 | Kim | .................. | H04W 72/1289 370/315 |
| 2013/0072209 A1* | 3/2013 | Haartsen | ............... | H04W 72/02 455/452.1 |
| 2014/0056220 A1* | 2/2014 | Poitau | ................. | H04W 40/246 370/328 |

(Continued)

OTHER PUBLICATIONS

International Search Report and Written Opinion dated Jul. 29, 2014 as received in Application No. PCT/US2014/026516.

*Primary Examiner* — Md Talukder
(74) *Attorney, Agent, or Firm* — Maschoff Brennan (57) ABSTRACT

A method of allocating a wireless communication resource to a device-to-device (D2D) pair of wireless devices may include determining an access-point interference threshold of an access point of a wireless communication network. The method may further include determining a device-to-device (D2D) signal power of a D2D signal at the access point. The D2D signal may be associated with D2D communications between a D2D pair of wireless devices. The method may also include assigning a wireless communication resource to the D2D pair based on a comparison of the access-point interference threshold with an access-point interference value where the access-point interference value is based on the determined D2D signal power at the access point.

27 Claims, 5 Drawing Sheets

(56) References Cited

U.S. PATENT DOCUMENTS

| | | | | |
|---|---|---|---|---|
| 2014/0057670 A1* | 2/2014 | Lim | ................... | H04W 8/005<br>455/509 |
| 2014/0064263 A1* | 3/2014 | Cheng | ................... | H04W 8/005<br>370/350 |
| 2014/0274183 A1* | 9/2014 | Zhu | ................... | H04W 72/082<br>455/513 |

* cited by examiner

WIRELESS RESOURCE ALLOCATION OF DEVICE-TO-DEVICE COMMUNICATION

CROSS-REFERENCE TO RELATED APPLICATIONS

This application is based upon and claims the benefit of priority of U.S. Provisional Application No. 61/785,458, filed on Mar. 14, 2013, the entire contents of which are incorporated herein by reference.

FIELD

The present disclosure relates to wireless communication resource allocation of device-to-device communication.

BACKGROUND

The proliferation of smartphones, tablets, laptop computers, and other electronic devices (referred to generally as "wireless devices") that use wireless communication networks has created an increased demand for ubiquitous and continuous wireless voice and data access. Device-to-device (D2D) communication may help satisfy this demand. For example, D2D communication may be performed between wireless devices and may allow the wireless devices to communicate information with each other. This D2D communication may allow for reuse of wireless communication resources, which may help satisfy the demand for wireless voice and data access.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of allocating a wireless communication resource to a device-to-device (D2D) pair of wireless devices may include determining an access-point interference threshold of an access point of a wireless communication network. The method may further include determining a device-to-device (D2D) signal power of a D2D signal at the access point. The D2D signal may be associated with D2D communications between a D2D pair of wireless devices. The method may also include assigning a wireless communication resource to the D2D pair based on a comparison of the access-point interference threshold with an access-point interference value where the access-point interference value is based on the determined D2D signal power at the access point.

The object and advantages of the embodiments will be realized and achieved at least by the elements, features, and combinations particularly pointed out in the claims.

It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

In particular embodiments, and, as described in further detail below, a wireless communication network may be configured to allocate wireless communication resources (e.g., frequency bands, time slots, etc.) to one or more device-to-device (D2D) pairs operating in the wireless communication network to facilitate D2D communication between the D2D pairs. Facilitating D2D communication may allow for lower power communication between the wireless devices of the D2D pairs and/or other wireless devices and an access point of the wireless communication network. Lower power communication may also allow for reuse of limited wireless communication resources by localizing the use of each wireless communication resource between the wireless devices participating in D2D communication.

In some embodiments, a wireless communication resource may be allocated to a D2D pair based on a determined signal power of a D2D signal transmitted by a transmitting wireless device of the D2D pair at an access point of the wireless communication network. In some embodiments, the wireless communication resource may also be assigned to wireless devices (either of the D2D pair or other wireless devices) for the communication of uplink signals that may be intended for reception by the access point. Therefore, as detailed below, the wireless communication resource may be allocated to the D2D pair based on an access-point interference threshold associated with the access point such that interference at the access point of the uplink signals communicated in the same wireless communication resource as the D2D signals may be within an acceptable range. The access-point interference threshold may be a designated amount of interference within the wireless communication resource that may be tolerated by the access point for uplink signals transmitted in the wireless communication resource and intended for the access point.

In some embodiments, and as described in further detail below, the wireless communication network may compare the access-point interference threshold with an access-point interference value, which may be based on a determined signal power of the D2D signal at the access point. The comparison may be performed to determine whether interference of uplink signals at the access point that may be caused by D2D signals transmitted in the wireless communication resource may be at or below an acceptable level. In some embodiments, when the access-point interference value is at or below the access-point interference threshold, the wireless communication network may allocate the wireless communication resource to the D2D pair such that the D2D pair may communicate with each other via D2D signals transmitted in the wireless communication resource. In contrast, when the access-point interference value is above the access-point interference threshold, the wireless communication network may not allocate the wireless communication resource to the D2D pair.

In some embodiments, the wireless communication resource may also be allocated to the D2D pair based on a receiving-device interference threshold of a receiving wireless device of the D2D pair. The receiving-device interference threshold may be a designated amount of interference within the wireless communication resource that may be tolerated by the receiving wireless device for the D2D signals transmitted in the wireless communication resource and intended for the receiving wireless device.

In some embodiments, and as described in further detail below, the wireless communication network may compare the receiving-device interference threshold with a receiving-device interference value. The receiving-device interference value may be based on a determined received signal power at the receiving wireless device of the D2D pair of a signal not transmitted by the transmitting wireless device of the D2D pair. The signal not transmitted by the transmitting wireless device of the D2D pair may be transmitted by another wireless device configured to transmit a signal (e.g., an uplink signal to the access point or a D2D signal associated with another D2D pair) in the wireless communication resource. The comparison may be made to determine whether interference of D2D signals at the receiving wireless device that may be caused by signals transmitted by the other wireless device in the wireless communication resource may be at an acceptable level. In some embodiments, when the receiving-device interference value is at or below the receiving interference threshold, the wireless communication network may allocate the wireless communication resource to the D2D pair such that the D2D pair may communicate with each other via D2D signals transmitted in the wireless communication resource. In contrast, when the receiving-device interference value is above the interference threshold, the wireless communication network may not allocate the wireless communication resource to the D2D pair.

Therefore, according to some embodiments described herein, interference of D2D communications and/or other communications between other wireless devices and the access point may be reduced while also allowing for the same wireless communication resource to be used for D2D communications and the communications between other wireless devices and the access point.

Although in some instances all the wireless communications described herein may be referred to as "cellular" type communications, to differentiate between communications between a D2D pair and communications between a wireless device and the access point, communications between a wireless device and the access point (e.g., uplink and downlink communications between the wireless device and the access point) may be generally referred to hereinafter as "cellular communications" and communications between a D2D pair may be referred to hereinafter as "D2D communications." Additionally, although the wireless devices of the D2D pair may be referred to in some instances as "cellular" type devices, wireless devices performing D2D communications may be referred to hereinafter as "D2D wireless devices" and wireless devices performing cellular communications may be referred to hereinafter as "cellular wireless devices." Additionally, a signal transmitted by a D2D transmitting wireless device that may be associated with D2D communications may be referred to as a "D2D signal" and a signal transmitted by a cellular wireless device that may be associated with cellular communications may be referred to as a "cellular signal."

For example, as mentioned above, a reference signal transmitted by a transmitting wireless device of a D2D pair that may be used to determine characteristics of a D2D propagation channel between the transmitting wireless device and a receiving wireless device of the D2D pair may be referred to as a "D2D reference signal." Additionally, a signal transmitted by the transmitting wireless device of the D2D pair that may be intended for the receiving wireless device of the D2D pair may be referred to generally as a "D2D signal." Similarly, a reference signal transmitted by a cellular wireless device that may be used to determine characteristics of an uplink propagation channel between the cellular wireless device and an access point may be referred to as a "cellular reference signal." Additionally, signals transmitted between the cellular wireless device and the access point (e.g., uplink and downlink signals communicated between the cellular wireless device and the access point) may be referred to generally as "cellular signals."

Embodiments of the present disclosure will be explained with reference to the accompanying drawings.

Figure 1:
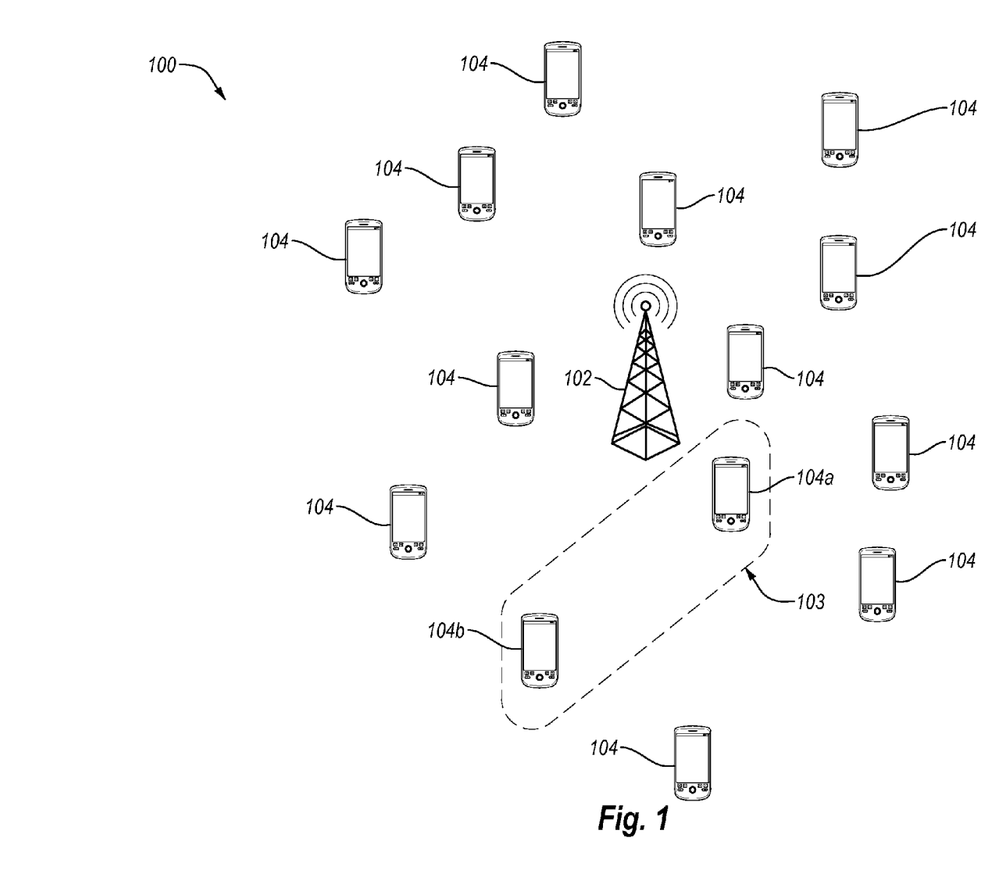
FIG. 1 illustrates an example wireless communication network configured to control the allocation of wireless communication resources associated with device-to-device (D2D) communication between wireless devices.

FIG. 1 illustrates an example wireless communication network 100 (referred to hereinafter as "network 100") configured to control the allocation of wireless communication resources associated with D2D communication between wireless devices, arranged in accordance with at least one embodiment of the present disclosure. The network 100 may be configured to provide wireless communication services to one or more wireless devices 104 via one or more access points 102. The wireless communication services may be voice services, data services, messaging services, and/or any suitable combination thereof. The network 100 may include a Frequency Division Multiple Access (FDMA) network, an Orthogonal FDMA (OFDMA) network, a Code Division Multiple Access (CDMA) network, a Time Division Multiple Access (TDMA) network, and/or any other suitable wireless communication network. In some embodiments, the network 100 may be configured as a third generation (3G) wireless communication network and/or a fourth generation (4G) wireless communication network. In these or other embodiments, the network 100 may be configured as a long term evolution (LTE) wireless communication network.

The access point 102 may be any suitable wireless communication network communication point and may include, by way of example but not limitation, a base station, an evolved node "B" (eNB) base station, a remote radio head (RRH), or any other suitable communication point. The wireless devices 104 may include any devices that may use the network 100 for obtaining wireless communication services and may include, by way of example and not limitation, a cellular phone, a smartphone, a personal data assistant (PDA), a laptop computer, a personal computer, a tablet computer, or any other similar device.

In some embodiments, as mentioned above, the network 100 may be configured to supervise D2D communication between wireless devices 104. In some of these embodiments, the access point 102 may be configured to allocate wireless communication resources to a D2D pair. In some embodiments, the wireless communication resources may be assigned to the D2D pairs during a determination of D2D transmission parameters such as that described in U.S. patent application Ser. No. 13/830,342 by Zhu et al., filed on Mar. 14, 2013, and entitled "NETWORK SUPERVISED DEVICE-TO-DEVICE COMMUNICATION," the entire contents of which are incorporated herein by reference.

Additionally, in some embodiments, the D2D pair may be selected based on neighbor discovery such as described in U.S. patent application Ser. No. 13/828,457 by Zhu et al., filed on Mar. 14, 2013 and entitled "NETWORK SUPERVISED WIRELESS DEVICE NEIGHBOR DISCOVERY" and such as described in U.S. patent application Ser. No. 13/828,617 by Zhu et al., filed on Mar. 14, 2013 and entitled "POWER CONTROL OF NEIGHBOR DISCOVERY SIGNALS," the entire contents of both of which are incorporated herein by reference.

For example, a wireless device 104a and a wireless device 104b may be configured as a D2D pair 103, and the access point 102 may be configured to allocate wireless communication resources to the D2D pair 103. In the illustrated example, the wireless device 104a may be configured to transmit D2D signals to the wireless device 104b such that the wireless device 104b may receive the D2D signals. Therefore, the wireless device 104a may be referred to as a "transmitting wireless device 104a" with respect to the D2D pair 103 and the wireless device 104b may be referred to as a "receiving wireless device 104b" with respect to the D2D pair 103 in the illustrated example.

In some embodiments, the access point 102 may direct the transmitting wireless device 104a to transmit the D2D signals using uplink channel wireless communication resources (e.g., time slots, frequencies, etc.) (referred to hereinafter as "uplink channel resources") that may also be used by one or more other wireless devices 104 to communicate information to the access point 102. As detailed below, the access point 102 may be configured to determine which uplink channel resources to allocate to the D2D pair 103 of the transmitting wireless device 104a and the receiving wireless device 104b such that interference of D2D communications of the D2D pair 103 and/or uplink communications may be reduced while also allowing the same uplink channel resources to be used for cellular communications.

Figure 2:
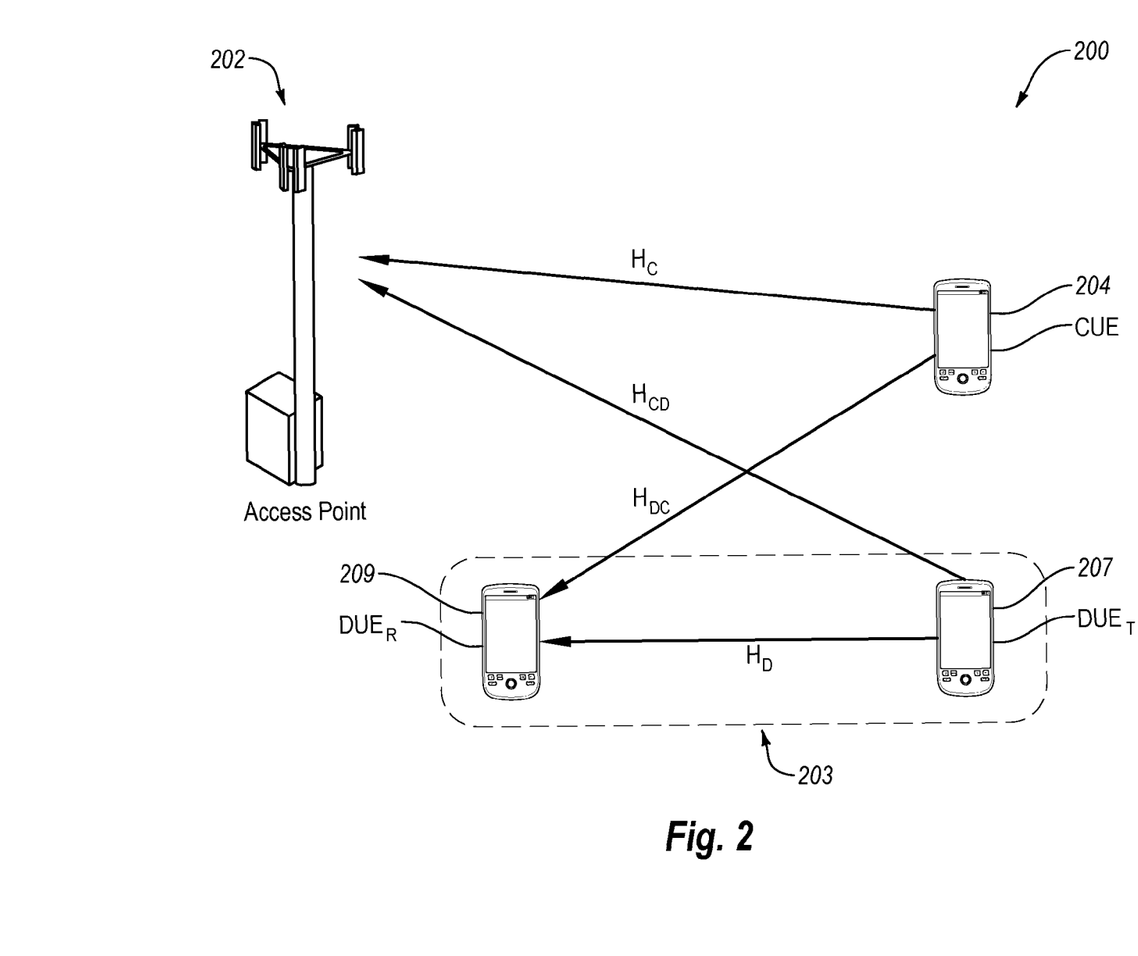
FIG. 2 illustrates an example wireless communication network where uplink channel resources may be shared by a D2D pair and a cellular wireless device.

FIG. 2 illustrates an example wireless communication network 200 (referred to hereinafter as "the network 200") where uplink channel resources may be shared by a D2D pair 203 and a cellular wireless device (CUE) 204, in accordance with at least one embodiment described herein. In the illustrated embodiment, the D2D pair 203 may include a transmitting wireless device ($DUE_T$) 207 and a receiving wireless device ($DUE_R$) 209.

In the illustrated embodiment, the CUE 204 may be configured to perform cellular communications with the access point 202 such that the CUE 204 may transmit uplink signals to the access point 202 via an uplink propagation channel $H_C$. In some embodiments, information associated with the uplink propagation channel $H_C$ may be determined based on a cellular reference signal transmitted by the CUE 204. In some embodiments, the cellular reference signal may be an SRS. In these or other embodiments, information associated with the uplink propagation channel $H_C$ may be determined based on previous cellular signals transmitted by the CUE 204. Further, the $DUE_T$ 207 may transmit D2D signals to the $DUE_R$ 209 via a D2D propagation channel $H_D$. In some embodiments, information related to the D2D propagation channel $H_D$ may be determined based on a D2D reference signal transmitted by the $DUE_T$ 207. In some embodiments, the D2D reference signal may be an SRS. In these or other embodiments, information related to the D2D propagation channel $H_D$ may be determined based on a previous D2D signal transmitted by the $DUE_T$ 207 to the $DUE_R$ 209. In these or other embodiments, information related to the D2D propagation channel $H_D$ may be determined during neighbor discovery of the D2D pair 203.

In some embodiments, the CUE 204 may transmit the uplink signals and the $DUE_T$ 207 may transmit the D2D signals using substantially the same uplink channel resources. As such, the uplink signals transmitted by the CUE 204 that may be intended for the access point 202 may also be received by the $DUE_R$ 209 via a propagation channel $H_{DC}$ that may exist between the CUE 204 and the $DUE_R$ 209. Additionally, D2D signals transmitted by the $DUE_T$ 207 and intended for the $DUE_R$ 209 may also be received by the access point 202 via a propagation channel $H_{CD}$ that may exist between the $DUE_T$ 207 and the access point 202.

As discussed in further detail below, the uplink channel resources shared by the D2D signals and the uplink signals may be allocated such that interference of uplink communications between the CUE 204 and the access point 202 by the D2D signals and/or interference of D2D communications between the $DUE_T$ 207 and the $DUE_R$ 209 by the uplink signals may be within an acceptable range. In some embodiments, the allocation of the uplink channel resources may be based on the following parameters (which may be determined based on the D2D reference signal and/or the cellular reference signal):

$L_{CD}$: Pathloss from the $DUE_T$ 207 to the access point 202;
$L_{DC}$: Pathloss from the CUE 204 to the $DUE_R$ 209;
$L_{DD}$: Pathloss from the $DUE_T$ 207 to the $DUE_R$ 209;
$P_{T,C}$: Transmit power of the CUE 204;
$P_{T,D}$: Transmit power of the $DUE_T$ 207;
$P_{R,CD}$: Received power of a D2D signal as measured at the access point 202;
$P_{R,DC}$: Received power of a cellular signal as measured at the $DUE_R$ 209; and
$P_{R,DD}$: Received power of the D2D signal as measured at the $DUE_R$ 209.

Additionally, the following relationships between the above-mentioned parameters may occur:

$P_{R,DC}=P_{T,C}L_{DC}$
$P_{R,CD}=P_{T,D}L_{CD}$
$P_{R,DD}=P_{T,D}L_{DD}$

Further, in some embodiments, uplink channel resources may be shared between the CUE 204 and the D2D pair 203 based on the uplink channel resources being scheduled for the CUE 204 and the D2D pair 203 without the knowledge of DUEs 207 and 209. Additionally, information related to average received power of uplink signals and D2D signals by the different wireless devices and the access point ($P_{DC}$, $P_{CD}$, and $P_{DD}$) may be available to the access point 202. In some embodiments, the average received powers and/or pathlosses may be acquired using SRS protocols and procedures with respect to the transmission and reception of the D2D and cellular reference signals.

Additionally, in some embodiments, the uplink channel resources may be paired between the CUE 204 and D2D pair 203 based on one or more interference thresholds, as mentioned above. For example, an interference threshold may be an access-point interference threshold ($I_C$) of the access point 202 with respect to the uplink channel resources associated with uplink signals received from the CUE 204. As mentioned above, the access-point interference threshold may be a designated amount of interference within the uplink channel resource associated with uplink signals from the CUE 204 that may be tolerated by the access point 202. In some embodiments, the access-point interference threshold may be set according to protocols and standards of the network 200.

In these or other embodiments, another interference threshold may be a receiving interference threshold ($I_D$) of the $DUE_R$ 209 for D2D signals received from the $DUE_T$ 207. As mentioned above, the receiving interference threshold may be a designated amount of interference within the uplink channel resource associated with the D2D signal that may be tolerated by $DUE_R$ 209. In some embodiments, the receiving interference threshold may be set according to protocols and standards that may be associated with D2D communication.

As disclosed in detail below, in some embodiments, the uplink channel resources used by the CUE 204 may be assigned to the D2D pair 203 when the interference of uplink signals at the access point 202 that may be caused by D2D signals (associated with the D2D pair 203 or other D2D pairs) is at or below the access-point interference threshold $I_C$ and/or the interference of D2D signals at the $DUE_R$ 209 that may be caused by the uplink signals or other D2D signals associated with other D2D pairs is at or below the receiving interference threshold $I_D$. In contrast, when the interference thresholds are not met, in some embodiments, the wireless communication resources used by the D2D pair 203 may be allocated based on a default wireless communication resource allocated by the network 200 for D2D communication. The interference of uplink signals at the access point 202 that may be caused by the D2D signals may be referred to as an "access-point interference value" and the interference of D2D signals at the $DUE_R$ 209 that may be caused by the uplink signals may be referred to as a "receiving-device interference value."

In some embodiments, the interference thresholds may be determined from a target Signal to Interference plus Noise Ratio (SINR) that may be associated with particular wireless communications (e.g., cellular communications or D2D communications) and that may be based on a target quality of service (QoS) for the particular communications. In some embodiments, the interference thresholds may also be based on a transmission power offset of the reference signal associated with the particular wireless communications (e.g., a D2D reference signal for D2D communications or a cellular reference signal for cellular communications). The transmission power offset may indicate a difference between a default transmission power of the reference signals and the actual transmission power of the reference signals, which may be dictated by the access point 202.

In some embodiments the SINR may be represented for the access point 202 and/or the $DUE_R$ using the following expression:

$$\gamma = \frac{P_R}{\Delta P(\sigma_n^2 + I)}$$

Where:
γ represents the SINR;
$P_R$ represents receive power of the reference signal (at the access point 202 or the $DUE_R$, as received by the access point 202 or the $DUE_R$, respectively, depending on which SINR is being determined);
$\Delta P$ represents the reference signal power offset;
I represents the in-cell co-channel interference (i.e., interference caused by signals transmitted in the uplink channel resource of interest that may be transmitted by devices within the area (cell) serviced by the access point 202); and
$\sigma_n^2$ is the out-of-cell co-channel interference and noise variance (i.e., interference caused by signals transmitted in the uplink channel resource of interest that may be transmitted by devices outside of the area (cell) serviced by the access point 202).

The interference (access-point interference or receiving-device interference, depending on which SINR is calculated) may be calculated by solving for I of the above SINR equation to achieve the following equation:

$$I = \frac{P_R}{\gamma \Delta P} - \sigma_n^2$$

The particular interference threshold (e.g., the access-point interference threshold or the receiving-device interference threshold) may be determined by using the target SINR and reference signal power offset for γ and $\Delta P$, respectively, as well as the out-of-cell co-channel interference ($\sigma_n^2$) in the above equation for the applicable communication, where the resulting value for "I" may indicate the interference threshold for the particular wireless communications.

For example, the access-point interference threshold ($I_C$) of the access point 202 associated with uplink communications between the access point 202 and the CUE 204 may be based on a target SINR of the uplink propagation channel $H_C$, the power offset of the cellular reference signal, and the in-cell and out-of-cell co-channel interference associated with uplink communications between the access point 202 and the CUE 204. Similarly, the receiving-device interference threshold ($I_D$) of the $DUE_R$ 209 associated with D2D communications between the $DUE_T$ 207 and the $DUE_R$ 209 may be based on a target SINR of the D2D propagation channel $H_D$, the power offset of the D2D reference signal, and/or the in-cell and out-of-cell co-channel interference associated with D2D communications between the $DUE_T$ 207 and the $DUE_R$ 209.

Assigning the CUE 204 and the D2D pair 203 to the same uplink channel resources based on the uplink interference threshold and/or the D2D interference threshold may be determined as described below.

In some embodiments, the D2D pair 203 may be assigned one of "J" number uplink channel resources that each may be used by a CUE, such as the CUE 204. Accordingly, each CUE associated with one of the uplink channel resources may be indexed from 1 to "J" such that an individual CUE of the group of "J" number CUEs may be represented by "j." Using information derived from reference signal protocols and/or previous cellular communications, the power of cellular signals transmitted by the CUE "j," as received at the $DUE_R$ 209 ($P_{R,DC}$(j)), may be determined. The uplink channel resources assigned to the CUE with the cellular signal with the lowest $P_{R,DC}$(j) ($CUE(j_{min})$) may be determined and selected for the D2D pair 203 to determine which of the cellular signals from the CUEs may have the lowest received power at the $DUE_R$ 209 ($P_{R,DC,min}$). In some embodiments, $P_{R,DC,min}$ may be used as the receiving-device interference value that may be compared with the receiving-device interference threshold of the $DUE_R$ 209 ($I_D$) to determine whether $P_{R,DC,min}$ is less than $I_D$.

Additionally, using reference signal protocols and/or previous D2D communications, the power of a D2D signal as received at the access point 202 ($P_{R,CD}$) may be determined. In some embodiments, $P_{R,CD}$ may be used as the access-point interference value of the access point 202, which may be compared with the access-point interference threshold of the access point 202 for the uplink channel resource and uplink channel associated with the $CUE(j_{min})(I_C(j_{min}))$ to determine whether $P_{R,CD}$ is less than $I_C(j_{min})$.

In some embodiments, if $P_{R,CD}$ is less than $I_C(j_{min})$ and $P_{R,DC,min}$ is less than $I_D$, then the D2D pair 203 may be assigned to share uplink signal resources with the $CUE(j_{min})$, which in the illustrated embodiment may be the CUE 204. If $P_{R,CD}$ is not less than $I_C(j_{min})$ or $P_{R,DC,min}$ is not less than $I_D$, the D2D pair 203 may be assigned a default uplink channel resource that may be designated for D2D communication (e.g., an uplink channel resource block group 0 (RBG0) that may also be assigned to a CUE0). This process may be repeated for any number of D2D pairs with respect to any number of suitable CUEs.

In some embodiments, the process may be based on the following algorithm for each D2D pair "k" in a set of "K" number D2D pairs that may be indexed from "1" to "K," with respect to a set of "J" number of CUEs "j" that may be indexed from "1" to "J":

---

For k in DUE set:
    Calculate the minimum interference for the D2D pair "k":
    $P_{DC,min}(k) = \min P_{DC}(k,j')$, $j = \arg\min P_{DC}(k,j')$
    If $P_{DC,min}(k) < I_D(k)$ and $P_{CD}(k) < I_C(j)$
        Pair DUEk with CUEj
    Otherwise
        Pair DUEk with the CUE0.
    End if
End For

---

In some embodiments, more than one D2D pair may be assigned to a wireless communication resource (e.g., uplink channel resource). To determine which D2D pair or pairs may be assigned to which communication resource, the access-point interference value and/or the receiving-device interference value may be based on a total interference associated with a particular wireless communication resource that may be associated with multiple D2D pairs communicating in the particular wireless communication resource.

Figure 3:
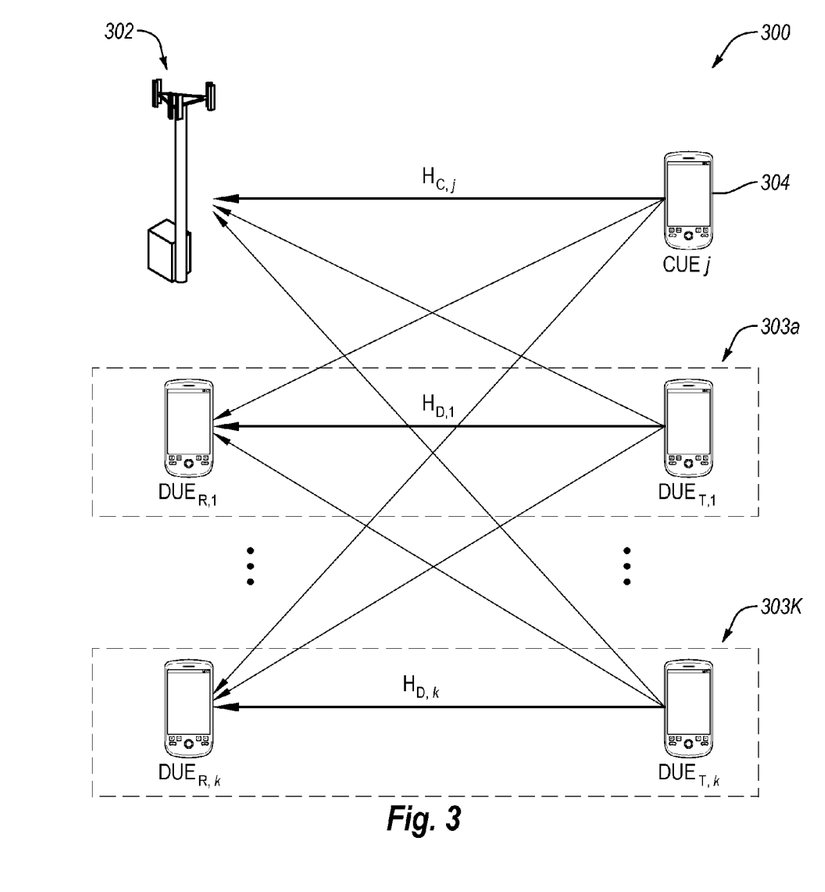
FIG. 3 illustrates an example wireless communication network where uplink channel resources may be shared by one or more D2D pairs and a cellular wireless device.

FIG. 3 illustrates an example wireless communication network 300 (referred to hereinafter as "the network 300") where uplink channel resources may be shared by one or more D2D pairs 303 and a cellular wireless device (CUE) 304, in accordance with at least one embodiment described herein. In the illustrated embodiment of FIG. 3, D2D pairs "1" through "k" (illustrated as D2D pairs 303a-303K in FIG. 3) may each include a transmitting wireless device $DUE_T$ (e.g., $DUE_{T,1}$ through $DUE_{T,k}$) and a receiving wireless device $DUE_R$ (e.g., $DUE_{R,1}$ through $DUE_{R,k}$). The $DUE_T$'S may be configured to transmit D2D signals in an uplink channel resource that may also be used by the CUE 304 to transmit uplink signals to an access point 302 of the network 300. Therefore, in some embodiments, uplink signals received by the access point 302 from the CUE 304 may experience interference from one or more of the $DUE_T$'S. In some embodiments, an access-point interference value of the access point 302 may be based on a total interference power at the access point 302 ($p_C(j)$) that may interfere with uplink signals that may be transmitted by the CUE 304 to the access point 302. The total interference power ($p_C(j)$) may be represented by the following expression:

$$p_C(j) = \sum_{k=1}^{K} P_{CD}(k, j)$$

In the above expression, "$P_{CD}(k,j)$" may represent the power of each D2D signal that may be transmitted by the associated $DUE_T(k)$ of the set "K" DUE pairs as received at the access point 302.

Additionally, in some embodiments, a receiving-device interference value may be determined for each $DUE_R(k)$ by determining the total interference power ($p_D(k)$) at each receiving $DUE_R(k)$, which may be represented by the following expression:

$$p_D(k) = \sum_{l=1}^{k-1} P_{DD}(l, k) + \sum_{l=k+1}^{K} P_{DD}(l, k) + p_{DC}(k, j)$$

In the above expression, "$P_{DD}(l,k)$" may represent the power of D2D signals that may be transmitted by a transmitting $DUE_T(l)$ that may be part of a D2D pair "l" included in the set "K" of the D2D pairs 303. Additionally, in the above expression "$p_{DC}(k, j)$" may represent the power of uplink signals transmitted by the CUE 304 as received at the $DUE_R(k)$ of the D2D pair "k."

Additionally, in some embodiments, one or more of the D2D pairs 303 may share uplink channel resources with the CUE 304 when the following conditions are satisfied:

$p_C(j) < I_C(j)$; and $p_D(k) < I_D(k)$ for all $k = 1 \ldots K$

In the above expression "$I_C(j)$" may represent an access-point interference threshold of the access point 302 with respect to uplink signals received from the CUE 304, and "$I_D(k)$" may represent a receiving-device interference threshold of the $DUE_R(k)$ with respect to D2D signals that may be received from its associated $DUE_T(k)$ of the D2D pair "k." In these and other embodiments, if the above conditions are not satisfied, one or more of the D2D pairs 303 may be assigned a default communication resource associated with D2D communications.

In some embodiments, the assigning of multiple D2D pairs 303 to an uplink channel resource may be determined based on the following algorithm for a set of "K" number of D2D pairs "k" that may be indexed from "1" to "K" with respect to a set of "J" number of CUEs "j" that may be indexed from "1" to "J":

---

Step 1. - Appoint a communication resource as a default communication resource for the D2D pairs "k" (e.g., appoint an RBG (e.g., RBG0) as a default RBG), Additionally, it may be assumed that a CUE0 has been scheduled on RBG0.
Step 2. - Initialize $p_D(k)$ and $p_C(j)$: $p_D(k) = 0$ for all k in D2D pair set, $p_C(j) = 0$ for all j in scheduled CUE set.
Step 3. - For k in D2D pair set
    For j in scheduled CUE set (excluded CUE0)
        If $p_C(j) + P_{CD}(k) > I_C(j)$ (violation) goto next j End if
        Set $p_{D,tmp} = P_{DC}(k,j)$
        For each D2D pair $l \neq k$ in D2D pair set that are paired with CUE j
            $p_{D,tmp} = p_{D,tmp} + P_{DD}(k,l)$
            if $p_D(l) + P_{DD}(l,k) > I_D(l)$ (violation) goto next j End if
        End for (l)
        If $p_{D,tmp} > I_D(j)$ (violation) goto next j End if
        Select D2D pair k to pair with CUE j
        Update the interference by:
            1. $p_D(k) = P_{D,tmp}$, $P_C(j) = P_C(j) + P_{CD}(k)$
            2. For each $l \neq k$ in D2D pair set that are paired with CUE j
                $p_D(l) = p_D(l) + P_{DD}(l,k)$
        Goto next k
    End for (j)
    If D2D pair k cannot be paired with any CUE, pair it with CUE0
    End if
End for (k)

---

Modifications may be made to the above algorithm according to some embodiments described herein. For example, instead of pairing a D2D pair 303 with a default wireless communication resource if certain conditions are not met, the D2D pair may be assigned a wireless communication resource that may be selected at random from a group of wireless communication resources, or may be assigned a wireless communication resource traditionally reserved for D2D communication. Additionally, in these or other embodiments, the threshold condition of whether $p_C(j)<I_C(j)$ may be checked and the other threshold condition $p_D(k)<I_D(k)$ for all $k=1 \ldots K$ may be ignored such that protecting throughput of the channel $H_{C,j}$ may be prioritized. In such instances, the amount of channel information used in determining wireless communication resource allocation may be reduced because channel information associated with the channels $H_{D,k}$ (e.g., $p_D(k)$) may be ignored.

Further, in some embodiments, the throughput of a channel $H_{C,0}$ between CUE0 and the access point 302 that may be assigned to the default uplink channel resource that may be assigned to D2D pairs 303 may be protected by reducing the transmit power of the D2D signals that may be transmitted by the $DUE_T$'S that may be assigned to the default uplink channel resources. For example, if the number of D2D pairs 303 assigned on RBG0 is "M," the transmission power ($P_{CD}(m,0)$) of the D2D signals that may be transmitted by each $DUE_T(m)$ of the D2D pairs "m" indexed from "1" to "M" assigned on RBG0 may be reduced using the following expression:

$$\left(\sum_{m=1}^{M} P_{CD}(m, 0) - I_C(0)\right) / M$$

Moreover, in some instances, a dynamic power adjustment may be performed for the candidate transmitting $DUE_T$'S if the interference threshold conditions for the channel $H_{C,j}$ between the CUE(j) 304 and the access point 302 are not met (e.g., $p_C(j)>I_C(j)$). In some embodiments, the transmit power of one or more of the transmitting $DUE_T$'S may be adjusted based on the interference threshold conditions being met and a receive power of D2D signals at the receiving $DUE_R$'s that correspond with the transmitting $DUE_T$'S also satisfying an applicable condition (e.g., the receive power of the D2D signals as received by the receiving $DUE_R$'s satisfying a receive power threshold associated with D2D standards).

In some embodiments, the assigning of multiple D2D pairs to an uplink channel resource using dynamic power control may be determined based on the following algorithm for a D2D pair set of "K" number of D2D pairs that may be indexed from "1" to "K" with respect to a set of "J" number of CUE's "j" that may be indexed from "1" to "J":

Step 1. - Appoint a communication resource as a default communication resource for D2D communication (e.g., a resource block group (RBG), (e.g., RBG0) as a default RBG, Additionally, it may be assumed that a CUE (e.g., the CUE0) has been scheduled on the default RBG (e.g., the RBG0).
Step 2. - Initialize $p_D(k)$ and $p_C(j)$: $p_D(k) = 0$ for all k in D2D pair set, $p_C(j) = 0$ for all j in scheduled CUE set.
Step 3. - For k in D2D pair set
    For j in scheduled CUE set (excluded CUE0)
        $\Delta_P(k)=0$
        If $p_C(j) + P_{CD}(k) > I_C(j)$ (violation)
            $\Delta_P(k) = p_C(j) + P_{CD}(k) - I_C(j)$ (calculate the power reduction for DUE_T )
            If $(P_{DD}(k,k) - \Delta_P(k) > P_{0,DUE})$
                Reducing $P_{DD}(l,k)$ by $\Delta_P(k)$
            Else
                Goto next j
            End if
        End if
        Set $p_{D,tmp} = P_{DC}(k,j)$
        For each D2D pair $l \neq k$ in D2D pair set that are paired with CUE j
            $p_{D,tmp} = p_{D,tmp} + P_{DD}(k,l)$
            if $p_D(l) + P_{DD}(l,k) > I_D(l)$ (violation) goto next j End if
        End for (l)
        If $p_{D,tmp} > I_D(j)$ (violation) goto next j End if
        Select D2D pair k to pair with CUE j
        Update the interference by:
            1. $p_D(k) = p_{D,tmp}$, $p_C(j) = p_C(j) + P_{CD}(k)$
            2. For each $l \neq k$ in D2D pair set that are paired with CUE j
                $p_D(l) = p_D(l) + P_{DD}(l,k)$
        Goto next k
    End for (j)
    If D2D pair k cannot be paired with any CUE, pair it with CUE0
    End if
End for (k).

In some embodiments, the dynamic power control may be included in downlink control information (DCI) that may be communicated to the transmitting $DUE_T$'S by the access point. Additionally, in some embodiments, an extra bit may be added to the DCI such that a greater granularity and/or dynamic range of power adjustment may be communicated to the transmitting $DUE_T$'s. Therefore, the changes to the DCI format may allow for improvement on the power adjustment described above. The additional bit may also be used for any other DCI communications to allow for better power adjustment of transmission power of the DUEs—e.g., power adjustments for uplink and/or D2D communications as may be suitable.

Table 1 below illustrates a change that may be made to add a bit to the DCI format to allow for greater power control, where the DCI format may have originally included two bits associated with power control, it may now include three bits.

TABLE 1

| TPC Command Field | Accumulated $\delta_{PUSCH,C}$ [dB] | Absolute $\delta_{PUSCH,C}$ [dB] |
|---|---|---|
| 0 (b000) | −1 | −4 |
| 1 (b001) | 0 | −1 |
| 2 (b010) | 1 | 1 |
| 3 (b011) | 3 | 4 |
| −4 (b100) | −5 | −12 |
| −3 (b101) | −4 | −10 |
| −2 (b110) | −3 | −8 |
| −1 (b111) | −2 | −6 |

In the illustrated example of Table 1, the extra bit in the DCI format may allow for eight different power adjustment options, which are illustrated as giving a greater dynamic range in power adjustment by including more bit sequences for increases or decreases in power. In contrast, including two bits in the DCI format for power control instead of three, as is done traditionally, may only allow for four different power adjustment options. In some embodiments, the extra bit sequences created by the extra bit may allow for greater granularity in power adjustment.

Therefore, the present disclosure may be used to assign wireless communication resources to a D2D pair such that the wireless communication resources may be reused and such that interference caused and experienced by the D2D signals may be within certain thresholds. In some embodiments, the wireless communication resources may be assigned to the D2D pairs during a determination of D2D transmission parameters.

Figure 4:
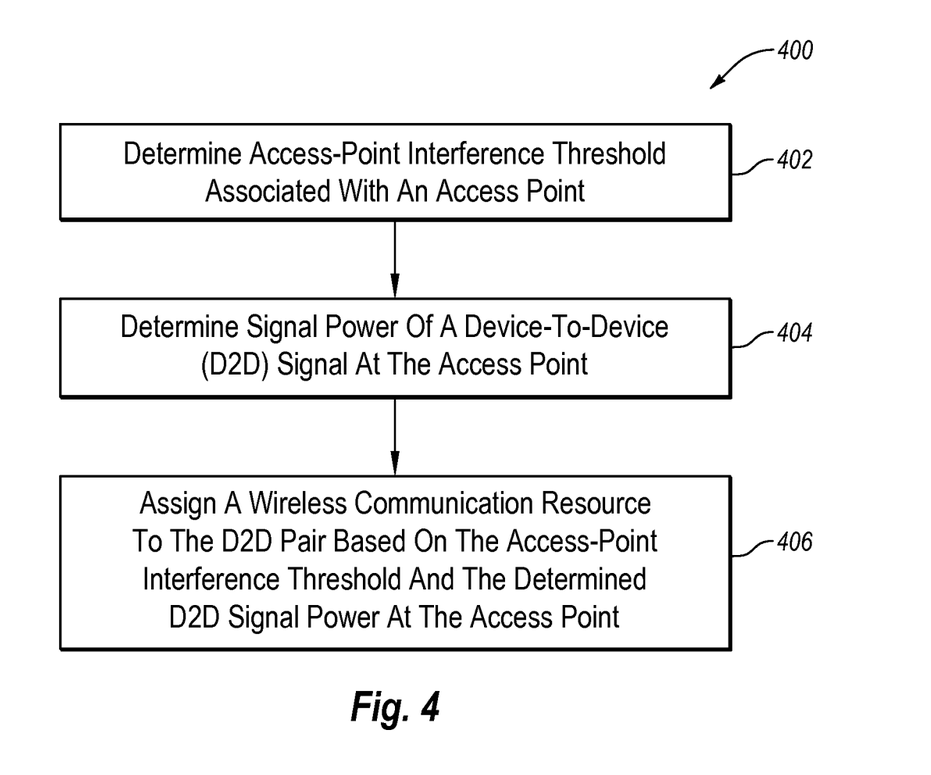
FIG. 4 is a flowchart of an example method of allocating a wireless communication resource to a D2D pair.

FIG. 4 is a flowchart of an example method 400 of allocating a wireless communication resource to a D2D pair, arranged in accordance with at least one embodiment of the present disclosure. The method 400 may be implemented, in some embodiments, by a wireless communication network, such as the networks 100, 200, or 300 described with respect to FIGS. 1-3, respectively. Although illustrated as discrete blocks, various blocks may be divided into additional blocks, combined into fewer blocks, or eliminated, depending on the desired implementation.

The method 400 may begin at block 402, where an access-point interference threshold may be determined. The access-point interference threshold may be associated with an access point communicating in a wireless communication resource. At block 404, a device-to-device (D2D) signal power of a D2D signal may be determined at the access point. The D2D signal may be associated with D2D communications between a D2D pair of wireless devices. Additionally, in some embodiments, the D2D signal power at the access point may be determined based on an SRS and/or a previous D2D signal transmitted by a transmitting wireless device of the D2D pair.

At block 406, a wireless communication resource may be assigned to the D2D pair based on the access-point interference threshold and the determined D2D signal power at the access point. In some embodiments, the wireless communication resource may be associated with an uplink channel. Additionally, the wireless communication resource may be assigned based on the wireless communication resource being a default wireless communication resource for D2D communications. In these or other embodiments, the wireless communication resource may be assigned based on randomly selecting the wireless communication resource from a group of available wireless communication resources.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the D2D pair may be a first D2D pair, the D2D signal may be a first D2D signal, the D2D signal power may be a first D2D signal power, and the method 400 may further include steps associated with determining a second D2D signal power of a second D2D signal at the access point. In these and other embodiments, the second D2D signal may be associated with D2D communications between a second D2D pair of wireless devices and the access point interference value may also be based on the second D2D signal power at the access point. Further, in these and other embodiments, the method 400 may include determining a receiving-device interference threshold of a receiving wireless device of the first D2D pair and determining a second D2D signal power of a second D2D signal at the receiving wireless device where the second D2D signal may be associated with D2D communications between the second D2D pair of wireless devices. The method 400 may additionally include in these and other embodiments assigning the wireless communication resource to the first D2D pair based on a comparison of the receiving-device interference threshold with a receiving-device interference value where the receiving-device interference value may be based on the second D2D signal power at the receiving wireless device.

Additionally, the method 400 may include steps associated with determining a receiving-device interference threshold of a receiving wireless device of the D2D pair and determining an uplink signal power of an uplink signal at the receiving wireless device. The uplink signal may be allocated in the wireless communication resource and associated with uplink communications between the access point and another wireless device not included in the D2D pair. The method 400 may also include steps associated with assigning the wireless communication resource to the D2D pair based on a comparison of the receiving-device interference threshold with a receiving-device interference value where the receiving-device interference value is based on the uplink signal power at the receiving wireless device.

Further, in some embodiments the method 400 may include steps associated with determining a reduction of a transmission power of the D2D signal such that the access-point interference value is at or below the access-point interference threshold and/or such that a received D2D signal power of the D2D signal, at a receiving wireless device of the D2D pair, is at or above a receive-device power threshold of the receiving wireless device. In these or other embodiments, the method 400 may include adding an extra bit to DCI communicated to the transmitting wireless device and the power may be adjusted based on the extra bit.

Figure 5:
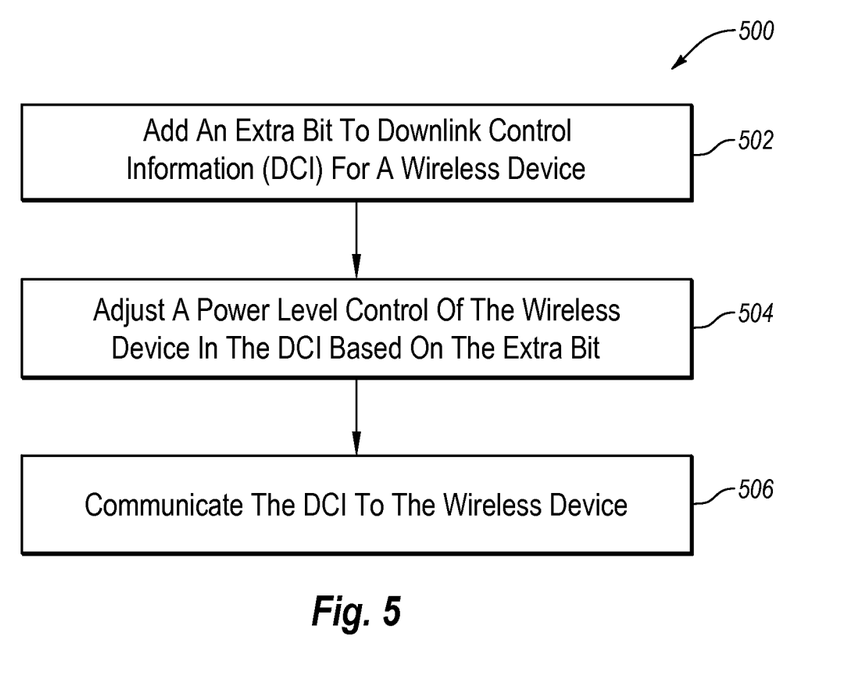
FIG. 5 is a flowchart of an example method of providing power control in wireless communications.

FIG. 5 is a flowchart of an example method 500 of providing power control in wireless communications, arranged in accordance with at least one embodiment of the present disclosure. The method 500 may be implemented, in some embodiments, by a wireless communication network, such as the networks 100, 200, or 300 described with respect to FIGS. 1-3, respectively. Although illustrated as discrete blocks, various blocks may be divided into additional blocks, combined into fewer blocks, or eliminated, depending on the desired implementation.

The method 500 may begin at block 502 where an extra bit may be added to downlink control information (DCI) for a wireless device. At block 504, a power level control of the wireless device may be adjusted in the DCI based on the extra bit and at block 506, the DCI may be communicated to the wireless device. The extra bit may be used to increase the dynamic range and/or granularity of adjustment of the power level control of the wireless device. In some embodiments, the extra bit may increase a power level control portion of the DCI from two bits to three bits. Additionally, in some embodiments, the extra bit may be used to adjust the power level of a transmitting wireless device of a D2D pair, which in some instances may allow for assignment of a wireless communication resource to the D2D pair that may not have otherwise been available.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Embodiments described herein, e.g., the method 400 described above, may be implemented using computer-readable media for carrying or having computer-executable instructions or data structures stored thereon. Such computer-readable media may be any available media that may be accessed by a general purpose or special purpose computer (e.g., a processor). By way of example, and not limitation, such computer-readable media may include a non-transitory or tangible computer-readable storage media including Random Access Memory (RAM), Read-Only Memory (ROM), Electrically Erasable Programmable Read-Only Memory (EEPROM), Compact Disc Read-Only Memory (CD-ROM)

or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of allocating a wireless communication resource to a device-to-device (D2D) pair of wireless devices, the method comprising:
    determining an access-point interference threshold of an access point of a wireless communication network;
    determining a device-to-device (D2D) signal power of a D2D signal at the access point, the D2D signal being a D2D communication between a D2D pair of wireless devices and the determined D2D signal power indicating a power of the D2D signal at the access point;
    determining a receiving-device interference threshold of a receiving wireless device of the D2D;
    determining an uplink signal power of an uplink signal at the receiving wireless device, the uplink signal being allocated in the wireless communication resource and associated with uplink communications between the access point and another wireless device not included in the D2D pair and the determined uplink signal power indicating a power of the uplink signal at the receiving wireless device; and
    assigning a wireless communication resource to the D2D pair for D2D communications between each other based on:
        a comparison of the access-point interference threshold with an access-point interference value where the access-point interference value is based on the determined D2D signal power at the access point; and
        a comparison of the receiving-device interference threshold with a receiving-device interference value where the receiving-device interference value is based on the uplink signal power at the receiving wireless device.

2. The method of claim 1, wherein the D2D pair is a first D2D pair, the D2D signal is a first D2D signal, and the D2D signal power is a first D2D signal power, the method further comprising determining a second D2D signal power of a second D2D signal at the access point, the second D2D signal being a D2D communication between a second D2D pair of wireless devices, the determined second D2D signal power indicating a power of the second D2D signal at the access point, and the access-point interference value also being based on the second D2D signal power at the access point.

3. The method of claim 1, wherein the D2D pair is a first D2D pair, the D2D signal is a first D2D signal, and the D2D signal power is a first D2D signal power, the method further comprising:
    determining a second D2D signal power of a second D2D signal as received at the receiving wireless device, the second D2D signal being associated with D2D communications between a second D2D pair of wireless devices and the second D2D signal power indicating a power of the second D2D signal at the receiving wireless device; and
    assigning the wireless communication resource to the first D2D pair based on a comparison of the receiving-device interference threshold with the receiving-device interference value where the receiving-device interference value is additionally based on the second D2D signal power at the receiving wireless device.

4. The method of claim 1, further comprising determining the D2D signal power at the access point based on a sounding reference signal (SRS) that is received at the access point.

5. The method of claim 1, further comprising determining the D2D signal power at the access point based on a previous D2D signal transmitted by a transmitting wireless device of the D2D pair and received at the access point.

6. The method of claim 1, wherein the wireless communication resource is associated with an uplink channel.

7. The method of claim 1, further comprising assigning the wireless communication resource based on the wireless communication resource being a default wireless communication resource for D2D communications.

8. The method of claim 1, further comprising assigning the wireless communication resource based on randomly selecting the wireless communication resource from a group of available wireless communication resources.

9. The method of claim 1, further comprising determining a reduction of a transmission power of the D2D signal such that the access-point interference value is at or below the access-point interference threshold.

10. The method of claim 9, further comprising determining the reduction of the transmission power such that a received D2D signal power of the D2D signal, at the receiving wireless device of the D2D pair, is at or above a receive-device power threshold of the receiving wireless device.

11. The method of claim 1, further comprising adding an extra bit to downlink control information (DCI) communicated to a transmitting wireless device of the D2D pair configured to transmit the D2D signal, the extra bit being associated with transmission power adjustment of the D2D signal.

12. The method of claim 11, further comprising:
adjusting a power level control of the transmitting wireless device in the DCI based on the extra bit; and
communicating the DCI to the transmitting wireless device.

13. The method of claim 12, wherein a power level control portion of the DCI is increased from two bits to three bits.

14. The method of claim 12, wherein the extra bit increases a dynamic range of the power level control of the transmitting wireless device.

15. The method of claim 12, wherein the extra bit increases a granularity of the power level control of the transmitting wireless device.

16. A processor configured to execute computer instructions to cause a system to perform operations for allocating a wireless communication resource to a device-to-device (D2D) pair of wireless devices, the operations comprising:
determining an access-point interference threshold of an access point of a wireless communication network;
determining a device-to-device (D2D) signal power of a D2D signal at the access point, the D2D signal being a D2D communication between a D2D pair of wireless devices and the determined D2D signal power indicating a power of the D2D signal at the access point;
determining a receiving-device interference threshold of a receiving wireless device of the D2D pair;
determining an uplink signal power of an uplink signal at the receiving wireless device, the uplink signal being allocated in the wireless communication resource and associated with uplink communications between the access point and another wireless device not included in the D2D pair and the determined uplink signal power indicating a power of the uplink signal at the receiving wireless device; and
assigning a wireless communication resource to the D2D pair for D2D communications between each other based on:
a comparison of the access-point interference threshold with an access-point interference value where the access-point interference value is based on the determined D2D signal power at the access point; and
a comparison of the receiving-device interference threshold with a receiving-device interference value where the receiving-device interference value is based on the uplink signal power at the receiving wireless device.

17. The processor of claim 16, wherein the D2D pair is a first D2D pair, the D2D signal is a first D2D signal, and the D2D signal power is a first D2D signal power, the operations further comprising determining a second D2D signal power of a second D2D signal at the access point, the second D2D signal being a D2D communication between a second D2D pair of wireless devices, the determined second D2D signal power indicating a power of the second D2D signal at the access point, and the access-point interference value also being based on the second D2D signal power at the access point.

18. The processor of claim 16, wherein the D2D pair is a first D2D pair, the D2D signal is a first D2D signal, and the D2D signal power is a first D2D signal power, the operations further comprising:
determining a second D2D signal power of a second D2D signal as received at the receiving wireless device, the second D2D signal being associated with D2D communications between a second D2D pair of wireless devices and the second D2D signal power indicating a power of the second D2D signal at the receiving wireless device; and
assigning the wireless communication resource to the first D2D pair based on a comparison of the receiving-device interference threshold with the receiving-device interference value where the receiving-device interference value is additionally based on the second D2D signal power at the receiving wireless device.

19. The processor of claim 16, wherein the operations further comprise determining the D2D signal power at the access point based on a sounding reference signal (SRS) that is received at the access point.

20. The processor of claim 16, wherein the operations further comprise determining the D2D signal power at the access point based on a previous D2D signal transmitted by a transmitting wireless device of the D2D pair and received at the access point.

21. The processor of claim 16, wherein the wireless communication resource is associated with an uplink channel.

22. The processor of claim 16, wherein the operations further comprise assigning the wireless communication resource based on the wireless communication resource being a default wireless communication resource for D2D communications.

23. The processor of claim 16, wherein the operations further comprise assigning the wireless communication resource based on randomly selecting the wireless communication resource from a group of available wireless communication resources.

24. The processor of claim 16, wherein the operations further comprise determining a reduction of a transmission power of the D2D signal such that the access-point interference value is at or below the access-point interference threshold.

25. The processor of claim 24, wherein the operations further comprise determining the reduction of the transmission power such that a received D2D signal power of the D2D signal, at the receiving wireless device of the D2D pair, is at or above a receive-device power threshold of the receiving wireless device.

26. The processor of claim 16, wherein the operations further comprise adding an extra bit to downlink control information (DCI) communicated to a transmitting wireless device of the D2D pair configured to transmit the D2D signal, the extra bit being associated with transmission power adjustment of the D2D signal.

27. The processor of claim 16, wherein assigning the wireless communication resource to the D2D pair based on the access-point interference threshold and the determined D2D signal power at the access point is based on a comparison of the access-point interference threshold with an access-point interference value where the access-point interference value is based on the determined D2D signal power at the access point.

* * * * *